US008751383B2

(12) United States Patent
Hirka et al.

(10) Patent No.: US 8,751,383 B2
(45) Date of Patent: Jun. 10, 2014

(54) MULTIPLE ACCOUNT ADVANCED PAYMENT CARD AND METHOD OF ROUTING CARD TRANSACTIONS

(71) Applicant: JPMorgan Chase Bank, N.A., New York, NY (US)

(72) Inventors: Jeffrey L. Hirka, Memphis, TN (US); Debra C. Fellner, Wilmington, DE (US); Steven Fox, Newark, DE (US); Lee Knackstedt, Bear, DE (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 13/944,227

(22) Filed: Jul. 17, 2013

(65) Prior Publication Data

US 2013/0304643 A1 Nov. 14, 2013

Related U.S. Application Data

(60) Division of application No. 13/275,927, filed on Oct. 18, 2011, now Pat. No. 8,515,868, which is a continuation of application No. 11/846,842, filed on Aug. 29, 2007, which is a continuation of application No. 10/201,589, filed on Jul. 24, 2002, now Pat. No. 7,860,789.

(60) Provisional application No. 60/307,179, filed on Jul. 24, 2001.

(51) Int. Cl.
*G06Q 40/00* (2012.01)
*G06Q 20/04* (2012.01)
*G06Q 20/34* (2012.01)

(52) U.S. Cl.
CPC .............. *G06Q 20/04* (2013.01); *G06Q 20/34* (2013.01)
USPC ............................................. 705/39; 705/41

(58) Field of Classification Search
CPC ............................... G06Q 20/04; G06Q 20/34
USPC ...................................................... 705/39, 41
See application file for complete search history.

(56) References Cited

U.S. PATENT DOCUMENTS 3,230,650 A 1/1966 Orkin
3,713,235 A 1/1973 Roberts
(Continued)

FOREIGN PATENT DOCUMENTS

DE 19702532 3/1998
DE 102006015818 10/2007
(Continued)

OTHER PUBLICATIONS

"In Time of Need: A National Strategy for Disaster Relief Cards," prepared by JPMorgan Chase Treasury Services—Public Sector, Jan. 26, 2007.

(Continued)

*Primary Examiner* — Kenneth Bartley
(74) *Attorney, Agent, or Firm* — Hunton & Williams LLP

(57) ABSTRACT

A system of accessing through a financial processing network multiple accounts associated with a single financial card. Data is input to the financial network in addition to the transaction data and the account identification data that in read from the card. This addition data permits the proper account to be accessed. The data may be input at the point of sale as an account selection. In this instance, the selection may be used to route the transaction data through the financial processing network or may be used to read data regarding one of multiple accounts encoded on the card. The data may also be stored as conditional routing rules at transfer points in the financial processing network. In this instance, the transaction is routed to the proper account based on the stored rules.

6 Claims, 4 Drawing Sheets

(56) References Cited

U.S. PATENT DOCUMENTS

| | | |
|---|---|---|
| 3,793,624 A | 2/1974 | Vaskunas et al. |
| 3,821,060 A | 6/1974 | Braca et al. |
| 3,855,033 A | 12/1974 | Staats |
| 3,938,090 A | 2/1976 | Borison et al. |
| 3,946,206 A | 3/1976 | Darjany |
| 4,022,943 A | 5/1977 | Erb et al. |
| 4,047,033 A | 9/1977 | Maimberg |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| 4,205,780 A | 6/1980 | Burns |
| D259,048 S | 4/1981 | Peterson |
| 4,264,808 A | 4/1981 | Owens et al. |
| 4,321,672 A | 3/1982 | Braun et al. |
| 4,338,587 A | 7/1982 | Chiappetti |
| 4,380,699 A | 4/1983 | Monnier et al. |
| 4,453,074 A | 6/1984 | Weinstein |
| 4,454,414 A | 6/1984 | Benton |
| 4,479,995 A | 10/1984 | Suzuki et al. |
| 4,545,838 A | 10/1985 | Minkus |
| 4,575,127 A | 3/1986 | Michel |
| 4,575,621 A | 3/1986 | Dreifus |
| 4,605,844 A | 8/1986 | Haggan |
| 4,643,452 A | 2/1987 | Chang et al. |
| 4,647,714 A | 3/1987 | Goto |
| 4,648,189 A | 3/1987 | Michel |
| 4,650,981 A | 3/1987 | Foletta |
| 4,669,730 A | 6/1987 | Small |
| 4,697,072 A | 9/1987 | Kawana |
| 4,700,055 A | 10/1987 | Kashkashian, Jr. |
| 4,701,601 A | 10/1987 | Francini et al. |
| 4,707,594 A | 11/1987 | Roth |
| 4,723,212 A | 2/1988 | O'Brien |
| 4,736,094 A | 4/1988 | Yoshida |
| 4,747,620 A | 5/1988 | Kay et al. |
| 4,750,119 A | 6/1988 | Cohen et al. |
| 4,755,661 A | 7/1988 | Ruebsam |
| 4,777,563 A | 10/1988 | Teraoka et al. |
| 4,817,949 A | 4/1989 | Bachman et al. |
| 4,831,242 A | 5/1989 | Englehardt |
| 4,837,422 A | 6/1989 | Dethloff et al. |
| 4,839,504 A | 6/1989 | Nakano |
| 4,845,347 A | 7/1989 | McCrindle |
| 4,849,614 A | 7/1989 | Watanabe et al. |
| 4,851,650 A | 7/1989 | Kitade |
| 4,856,857 A | 8/1989 | Takeuchi et al. |
| 4,859,837 A | 8/1989 | Halpern |
| 4,866,545 A | 9/1989 | LaManna et al. |
| 4,897,533 A | 1/1990 | Lyszczarz |
| D305,887 S | 2/1990 | Nishimura |
| 4,910,672 A | 3/1990 | Off |
| 4,931,623 A | 6/1990 | Nakamura et al. |
| 4,938,830 A | 7/1990 | Cannistra |
| 4,948,174 A | 8/1990 | Thomson et al. |
| D310,386 S | 9/1990 | Michels et al. |
| 4,977,501 A | 12/1990 | Lefevre |
| 4,978,401 A | 12/1990 | Bonomi |
| 5,025,139 A | 6/1991 | Halliburton, Jr. |
| 5,054,096 A | 10/1991 | Beizer |
| 5,072,380 A | 12/1991 | Randelman et al. |
| 5,095,194 A | 3/1992 | Barbanell |
| 5,097,115 A | 3/1992 | Ogasawara et al. |
| 5,117,355 A | 5/1992 | McCarthy |
| 5,121,945 A | 6/1992 | Thomson et al. |
| 5,122,950 A | 6/1992 | Mee et al. |
| 5,140,517 A | 8/1992 | Nagata et al. |
| 5,157,247 A | 10/1992 | Takahira |
| 5,163,098 A | 11/1992 | Dahbura |
| 5,173,851 A | 12/1992 | Off et al. |
| 5,175,416 A | 12/1992 | Mansvelt |
| 5,175,682 A | 12/1992 | Higashiyama |
| 5,177,342 A | 1/1993 | Adams |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel et al. |
| 5,202,826 A | 4/1993 | McCarthy |
| 5,237,620 A | 8/1993 | Deaton |
| 5,239,462 A | 8/1993 | Jones |
| 5,257,486 A | 11/1993 | Holmwall |
| 5,305,196 A | 4/1994 | Deaton et al. |
| 5,326,960 A | 7/1994 | Tannenbaum |
| 5,327,508 A | 7/1994 | Deaton et al. |
| 5,351,187 A | 9/1994 | Hassett |
| 5,352,877 A | 10/1994 | Morley |
| 5,380,046 A | 1/1995 | Stephens |
| 5,382,784 A | 1/1995 | Eberhardt |
| 5,383,687 A | 1/1995 | Suess et al. |
| 5,388,165 A | 2/1995 | Gabriel et al. |
| 5,397,881 A | 3/1995 | Mannik |
| 5,409,092 A | 4/1995 | Itako et al. |
| 5,412,190 A | 5/1995 | Kopesec et al. |
| 5,412,192 A | 5/1995 | Hoss |
| 5,413,341 A | 5/1995 | Lieberman |
| 5,424,524 A | 6/1995 | Ruppert |
| 5,430,644 A | 7/1995 | Deaton et al. |
| 5,432,326 A | 7/1995 | Noblett et al. |
| 5,440,108 A | 8/1995 | Tran et al. |
| 5,444,794 A | 8/1995 | Uhland |
| 5,448,471 A | 9/1995 | Deaton et al. |
| 5,450,477 A | 9/1995 | Amarant |
| 5,450,491 A | 9/1995 | McNair |
| 5,465,206 A | 11/1995 | Hilt |
| 5,466,920 A | 11/1995 | Nair et al. |
| 5,471,669 A | 11/1995 | Lidman |
| 5,477,038 A | 12/1995 | Levine |
| 5,477,040 A | 12/1995 | Lalonde |
| 5,481,094 A | 1/1996 | Suda |
| 5,482,139 A | 1/1996 | Rivalto |
| 5,489,123 A | 2/1996 | Roshkoff |
| 5,495,981 A | 3/1996 | Warther |
| 5,500,514 A | 3/1996 | Veeneman |
| 5,500,890 A | 3/1996 | Rogge et al. |
| 5,503,891 A | 4/1996 | Marshall et al. |
| 5,530,232 A | 6/1996 | Taylor |
| 5,532,689 A | 7/1996 | Bueno |
| 5,541,583 A | 7/1996 | Mandelbaum |
| 5,546,446 A | 8/1996 | Tsunokawa et al. |
| 5,557,092 A | 9/1996 | Ackley et al. |
| 5,557,516 A | 9/1996 | Hogan |
| 5,563,934 A | 10/1996 | Eda |
| 5,572,004 A | 11/1996 | Raimann |
| 5,578,808 A | 11/1996 | Taylor |
| 5,583,933 A | 12/1996 | Mark |
| 5,585,787 A | 12/1996 | Wallerstein |
| 5,590,038 A | 12/1996 | Pitroda |
| 5,604,800 A | 2/1997 | Johnson et al. |
| 5,610,980 A | 3/1997 | Johnson et al. |
| 5,617,474 A | 4/1997 | Ditzig et al. |
| 5,619,558 A | 4/1997 | Jheeta |
| 5,637,845 A | 6/1997 | Kolls |
| 5,642,485 A | 6/1997 | Deaton et al. |
| 5,644,710 A | 7/1997 | Johnson et al. |
| 5,644,723 A | 7/1997 | Deaton et al. |
| 5,649,118 A | 7/1997 | Carlisle et al. |
| 5,650,604 A | 7/1997 | Marcous et al. |
| 5,652,786 A | 7/1997 | Rogers |
| 5,659,469 A | 8/1997 | Deaton et al. |
| 5,661,284 A | 8/1997 | Freeman et al. |
| 5,677,521 A | 10/1997 | Garrou |
| 5,680,459 A | 10/1997 | Hook et al. |
| 5,687,322 A | 11/1997 | Deaton et al. |
| 5,698,837 A | 12/1997 | Furuta |
| 5,703,344 A | 12/1997 | Bezy |
| 5,704,044 A | 12/1997 | Tarter et al. |
| 5,710,886 A | 1/1998 | Christensen |
| 5,715,298 A | 2/1998 | Rogers |
| 5,721,768 A | 2/1998 | Stimson |
| 5,732,136 A | 3/1998 | Murphree et al. |
| 5,744,787 A | 4/1998 | Teicher |
| 5,745,555 A | 4/1998 | Mark |
| 5,748,737 A | 5/1998 | Daggar |

(56) References Cited

U.S. PATENT DOCUMENTS

| | | |
|---|---|---|
| 5,765,141 A | 6/1998 | Spector |
| 5,770,843 A | 6/1998 | Rose et al. |
| 5,774,882 A | 6/1998 | Keen |
| 5,777,305 A | 7/1998 | Smith |
| 5,787,403 A | 7/1998 | Randle |
| 5,787,404 A | 7/1998 | Fernandez-Holmann |
| 5,789,732 A | 8/1998 | McMahon et al. |
| 5,790,636 A | 8/1998 | Marshall |
| 5,796,827 A | 8/1998 | Coppersmith et al. |
| 5,797,133 A | 8/1998 | Jones |
| 5,798,950 A | 8/1998 | Fitzgerald |
| 5,806,047 A | 9/1998 | Hackel et al. |
| 5,814,796 A | 9/1998 | Benson et al. |
| 5,825,871 A | 10/1998 | Mark |
| 5,826,243 A | 10/1998 | Musmanno et al. |
| 5,832,090 A | 11/1998 | Raspotnik |
| 5,857,079 A | 1/1999 | Claus |
| 5,857,709 A | 1/1999 | Chock |
| 5,859,419 A | 1/1999 | Wynn |
| 5,864,830 A | 1/1999 | Armetta |
| 5,870,456 A | 2/1999 | Rogers |
| 5,870,718 A | 2/1999 | Spector |
| 5,877,975 A | 3/1999 | Jigour et al. |
| D408,054 S | 4/1999 | Leedy, Jr. |
| 5,897,621 A | 4/1999 | Boesch et al. |
| 5,901,303 A | 5/1999 | Chew |
| 5,903,879 A | 5/1999 | Mitchell |
| 5,907,142 A | 5/1999 | Kelsey |
| 5,926,792 A | 7/1999 | Koppes et al. |
| 5,926,800 A | 7/1999 | Baronowski |
| 5,928,082 A | 7/1999 | Clapper |
| 5,936,221 A | 8/1999 | Corder et al. |
| 5,946,669 A | 8/1999 | Polk |
| 5,949,044 A | 9/1999 | Walker et al. |
| 5,953,710 A | 9/1999 | Fleming |
| 5,955,961 A | 9/1999 | Wallerstein |
| 5,960,411 A | 9/1999 | Hartman et al. |
| 5,963,925 A | 10/1999 | Kolling et al. |
| 5,970,469 A | 10/1999 | Scroggie et al. |
| 5,970,478 A | 10/1999 | Walker et al. |
| 5,970,479 A | 10/1999 | Shepherd |
| 5,974,146 A | 10/1999 | Randle et al. |
| 5,979,757 A | 11/1999 | Tracy |
| 5,991,736 A | 11/1999 | Ferguson et al. |
| 5,991,750 A | 11/1999 | Watson |
| 5,999,624 A | 12/1999 | Hopkins |
| 5,999,917 A | 12/1999 | Facciani et al. |
| 6,000,608 A | 12/1999 | Dorf |
| 6,006,205 A | 12/1999 | Loeb et al. |
| 6,012,049 A | 1/2000 | Kawan |
| 6,014,634 A | 1/2000 | Scroggie et al. |
| 6,014,749 A | 1/2000 | Gloor et al. |
| 6,016,954 A | 1/2000 | Abe |
| 6,018,718 A | 1/2000 | Walker et al. |
| 6,021,189 A | 2/2000 | Vu |
| 6,024,286 A | 2/2000 | Bradley et al. |
| 6,025,283 A | 2/2000 | Roberts |
| 6,029,144 A | 2/2000 | Barrett et al. |
| 6,029,153 A | 2/2000 | Bauchner et al. |
| 6,032,135 A | 2/2000 | Molano et al. |
| 6,032,136 A | 2/2000 | Brake et al. |
| 6,032,859 A | 3/2000 | Muehlberger et al. |
| 6,036,099 A | 3/2000 | Leighton |
| 6,038,552 A | 3/2000 | Fleischl |
| 6,044,360 A | 3/2000 | Picciallo |
| 6,045,050 A | 4/2000 | Ippolito et al. |
| 6,048,271 A | 4/2000 | Barcelou |
| 6,055,573 A | 4/2000 | Gardenswartz et al. |
| 6,061,660 A | 5/2000 | Eggleston et al. |
| D427,167 S | 6/2000 | Iwasaki |
| 6,073,160 A | 6/2000 | Grantham et al. |
| 6,085,976 A | 7/2000 | Sehr |
| 6,089,284 A | 7/2000 | Kaehler et al. |
| 6,092,057 A | 7/2000 | Zimmerman et al. |
| 6,105,006 A | 8/2000 | Davis et al. |
| 6,105,007 A | 8/2000 | Norris |
| 6,105,008 A | 8/2000 | Davis et al. |
| 6,105,009 A | 8/2000 | Cuervo |
| 6,112,190 A | 8/2000 | Fletcher et al. |
| 6,119,103 A | 9/2000 | Basch et al. |
| 6,119,107 A | 9/2000 | Polk |
| 6,129,572 A | 10/2000 | Feldman et al. |
| 6,134,309 A | 10/2000 | Carson |
| 6,138,911 A | 10/2000 | Fredregill et al. |
| 6,138,917 A | 10/2000 | Chapin, Jr. |
| 6,141,666 A | 10/2000 | Tobin |
| 6,142,640 A | 11/2000 | Schofield |
| 6,144,848 A | 11/2000 | Walsh et al. |
| 6,148,293 A | 11/2000 | King |
| 6,163,771 A | 12/2000 | Walker et al. |
| 6,164,548 A | 12/2000 | Curiel |
| 6,179,211 B1 | 1/2001 | Green et al. |
| 6,182,059 B1 | 1/2001 | Angotti et al. |
| D437,882 S | 2/2001 | Creighton |
| 6,185,541 B1 | 2/2001 | Scroggie et al. |
| 6,188,309 B1 | 2/2001 | Levine |
| 6,189,787 B1 | 2/2001 | Dorf |
| 6,192,142 B1 | 2/2001 | Pare, Jr. et al. |
| 6,195,419 B1 | 2/2001 | Gilboy |
| 6,213,392 B1 | 4/2001 | Zuppicich |
| 6,222,914 B1 | 4/2001 | McMullin |
| D442,627 S | 5/2001 | Webb et al. |
| 6,227,445 B1 | 5/2001 | Brookner |
| 6,227,972 B1 | 5/2001 | Walker et al. |
| 6,260,758 B1 | 7/2001 | Blumberg |
| 6,267,292 B1 | 7/2001 | Walker et al. |
| 6,278,996 B1 | 8/2001 | Richardson et al. |
| 6,282,516 B1 | 8/2001 | Giuliani |
| 6,282,522 B1 | 8/2001 | Davis et al. |
| 6,289,322 B1 | 9/2001 | Kitchen et al. |
| 6,292,786 B1 | 9/2001 | Deaton et al. |
| 6,295,344 B1 | 9/2001 | Marshall |
| 6,295,522 B1 | 9/2001 | Boesch |
| D449,336 S | 10/2001 | Webb et al. |
| 6,308,887 B1 | 10/2001 | Korman et al. |
| 6,315,193 B1 | 11/2001 | Hogan |
| 6,315,195 B1 | 11/2001 | Ramachandran |
| 6,324,524 B1 | 11/2001 | Lent et al. |
| 6,324,526 B1 | 11/2001 | Dagostino |
| 6,327,573 B1 | 12/2001 | Walker et al. |
| 6,327,575 B1 | 12/2001 | Katz |
| 6,330,543 B1 | 12/2001 | Kepecs |
| 6,330,546 B1 | 12/2001 | Gopinathan et al. |
| 6,344,108 B1 | 2/2002 | Von Medvey et al. |
| 6,345,766 B1 | 2/2002 | Taskett et al. |
| 6,349,290 B1 | 2/2002 | Horowitz et al. |
| 6,349,972 B1 | 2/2002 | Geiger et al. |
| 6,351,735 B1 | 2/2002 | Deaton et al. |
| 6,353,811 B1 | 3/2002 | Weissman |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,377,935 B1 | 4/2002 | Deaton et al. |
| 6,382,677 B1 | 5/2002 | Kaule et al. |
| 6,385,591 B1 | 5/2002 | Mankoff |
| 6,385,594 B1 | 5/2002 | Lebda et al. |
| 6,405,181 B2 | 6/2002 | Lent et al. |
| 6,405,182 B1 | 6/2002 | Cuervo |
| 6,409,593 B1 | 6/2002 | Petrecca |
| 6,411,939 B1 | 6/2002 | Parsons |
| 6,411,947 B1 | 6/2002 | Rice et al. |
| 6,419,161 B1 | 7/2002 | Haddad |
| 6,424,949 B1 | 7/2002 | Deaton et al. |
| 6,434,259 B1 | 8/2002 | Hamid et al. |
| D462,477 S | 9/2002 | Osborne |
| 6,454,647 B1 | 9/2002 | Woodbury, Jr. |
| 6,456,981 B1 | 9/2002 | Dejaeger et al. |
| 6,471,128 B1 | 10/2002 | Corcoran et al. |
| 6,481,125 B1 | 11/2002 | Pokrasoff |
| 6,484,146 B2 | 11/2002 | Day et al. |
| 6,484,428 B1 | 11/2002 | Greenwald et al. |

(56) References Cited

U.S. PATENT DOCUMENTS

| | | |
|---|---|---|
| D466,929 S | 12/2002 | Haas |
| D467,271 S | 12/2002 | Haas |
| D467,272 S | 12/2002 | Haas |
| 6,490,568 B1 | 12/2002 | Omara et al. |
| 6,491,782 B1 | 12/2002 | Jaynes |
| 6,494,367 B1 | 12/2002 | Zacharias |
| D468,789 S | 1/2003 | Arnold et al. |
| 6,505,095 B1 | 1/2003 | Kolls |
| 6,507,644 B1 | 1/2003 | Henderson et al. |
| 6,513,019 B2 | 1/2003 | Lewis |
| 6,553,113 B1 | 4/2003 | Dhir et al. |
| 6,557,039 B1 | 4/2003 | Leong et al. |
| D474,235 S | 5/2003 | Haas |
| 6,557,766 B1 | 5/2003 | Leighton |
| 6,558,255 B2 | 5/2003 | Walker et al. |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,791 B2 | 5/2003 | Lent et al. |
| 6,567,821 B1 | 5/2003 | Polk |
| 6,575,361 B1 | 6/2003 | Graves et al. |
| 6,581,845 B2 | 6/2003 | Ye |
| D476,681 S | 7/2003 | Al Amri |
| D476,683 S | 7/2003 | Kilburn |
| D477,359 S | 7/2003 | Haas |
| 6,592,044 B1 | 7/2003 | Wong et al. |
| 6,594,640 B1 | 7/2003 | Postrel |
| 6,595,342 B1 | 7/2003 | Maritzen et al. |
| 6,607,127 B2 | 8/2003 | Wong |
| 6,609,113 B1 | 8/2003 | O'Leary et al. |
| 6,609,654 B1 | 8/2003 | Anderson et al. |
| 6,609,658 B1 | 8/2003 | Sehr |
| D481,068 S | 10/2003 | Blossom et al. |
| 6,631,849 B2 | 10/2003 | Blossom |
| 6,644,551 B2 | 11/2003 | Clayman et al. |
| 6,647,374 B2 | 11/2003 | Kansal |
| 6,655,587 B2 | 12/2003 | Andrews et al. |
| 6,655,598 B1 | 12/2003 | Curiel |
| 6,659,259 B2 | 12/2003 | Knox et al. |
| 6,671,673 B1 | 12/2003 | Baseman et al. |
| D485,573 S | 1/2004 | Li |
| 6,675,149 B1 | 1/2004 | Ruffin et al. |
| 6,705,518 B2 | 3/2004 | Park et al. |
| 6,715,797 B2 | 4/2004 | Curiel |
| 6,726,813 B2 | 4/2004 | Kaule et al. |
| 6,727,802 B2 | 4/2004 | Kelly et al. |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,757,660 B2 | 6/2004 | Canada et al. |
| D493,195 S | 7/2004 | Creighton |
| 6,764,014 B2 | 7/2004 | Lasch et al. |
| D495,736 S | 9/2004 | Scharf |
| D496,365 S | 9/2004 | Liu et al. |
| 6,786,400 B1 | 9/2004 | Bucci |
| 6,793,131 B2 | 9/2004 | Hogan |
| 6,793,135 B1 | 9/2004 | Ryoo |
| 6,805,288 B2 | 10/2004 | Routhenstein et al. |
| 6,805,289 B2 | 10/2004 | Noriega et al. |
| D498,236 S | 11/2004 | Liu et al. |
| 6,814,282 B2 | 11/2004 | Seifert et al. |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| 6,856,973 B1 | 2/2005 | Bott |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,892,187 B2 | 5/2005 | Phillips et al. |
| 6,895,383 B2 | 5/2005 | Heinrich |
| 6,913,193 B1 | 7/2005 | Kawan |
| 6,924,026 B2 | 8/2005 | Jaynes |
| 6,931,382 B2 | 8/2005 | Laage et al. |
| 6,942,156 B2 | 9/2005 | Ohta et al. |
| 6,942,569 B2 | 9/2005 | Petracca |
| 6,945,453 B1 | 9/2005 | Schwarz Jr. |
| 6,947,898 B2 | 9/2005 | Postrel |
| 6,954,741 B1 | 10/2005 | Burchetta et al. |
| 6,961,710 B1 | 11/2005 | Yanagisawa et al. |
| 6,978,369 B2 | 12/2005 | Wheeler et al. |
| 6,999,569 B2 | 2/2006 | Risafi et al. |
| 6,999,938 B1 | 2/2006 | Libman |
| 6,999,943 B1 | 2/2006 | Johnson et al. |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,929 B2 | 5/2006 | Li |
| 7,054,842 B2 | 5/2006 | James et al. |
| 7,063,924 B2 | 6/2006 | Kaminsky et al. |
| 7,069,244 B2 | 6/2006 | Strayer et al. |
| 7,070,095 B1 | 7/2006 | Gandel et al. |
| 7,072,909 B2 | 7/2006 | Polk |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,107,249 B2 | 9/2006 | Dively |
| 7,113,914 B1 | 9/2006 | Spielmann et al. |
| D530,741 S | 10/2006 | Blossom |
| 7,120,601 B2 | 10/2006 | Chen et al. |
| 7,128,272 B2 | 10/2006 | Doublet |
| D533,220 S | 12/2006 | Graves et al. |
| 7,156,301 B1 | 1/2007 | Bonalle et al. |
| 7,163,153 B2 | 1/2007 | Blossom |
| 7,167,844 B1 | 1/2007 | Leong et al. |
| 7,184,973 B2 | 2/2007 | Monteleone et al. |
| D538,349 S | 3/2007 | Hollands |
| 7,188,110 B1 | 3/2007 | Ludtke et al. |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |
| 7,228,155 B2 | 6/2007 | Saunders |
| 7,239,226 B2 | 7/2007 | Berardi et al. |
| 7,243,839 B2 | 7/2007 | Beck et al. |
| 7,249,092 B2 | 7/2007 | Dunn et al. |
| 7,249,112 B2 | 7/2007 | Berardi et al. |
| 7,252,223 B2 | 8/2007 | Schofield |
| 7,252,226 B2 | 8/2007 | Risafi et al. |
| 7,254,560 B2 | 8/2007 | Singhal |
| 7,263,507 B1 | 8/2007 | Brake, Jr. et al. |
| D551,705 S | 9/2007 | Mershon |
| 7,266,524 B1 | 9/2007 | Butcher |
| 7,275,160 B2 | 9/2007 | Pearson et al. |
| 7,295,999 B1 | 11/2007 | Simon et al. |
| 7,306,141 B1 | 12/2007 | Schwarz |
| 7,306,163 B2 | 12/2007 | Scholz et al. |
| 7,310,617 B1 | 12/2007 | Cunningham |
| 7,311,244 B1 | 12/2007 | Schwarz |
| 7,312,707 B1 | 12/2007 | Bishop et al. |
| 7,315,843 B2 | 1/2008 | Diveley et al. |
| 7,318,049 B2 | 1/2008 | Iannacci |
| D562,888 S | 2/2008 | Brown |
| 7,337,144 B1 | 2/2008 | Blinn et al. |
| 7,346,567 B2 | 3/2008 | Weeks |
| 7,349,866 B2 | 3/2008 | Schwarz |
| 7,357,331 B2 | 4/2008 | Blossom |
| 7,359,880 B2 | 4/2008 | Abel et al. |

(56) References Cited

U.S. PATENT DOCUMENTS

| | | |
|---|---|---|
| 7,392,221 B2 | 6/2008 | Nabe |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| 7,401,731 B1 | 7/2008 | Pletz et al. |
| D576,671 S | 9/2008 | Field et al. |
| 7,426,492 B1 | 9/2008 | Bishop et al. |
| D582,476 S | 12/2008 | Field et al. |
| D582,977 S | 12/2008 | Field et al. |
| 7,461,028 B2 | 12/2008 | Wronski, Jr. |
| 7,479,320 B2 | 1/2009 | Keller et al. |
| 7,493,288 B2 | 2/2009 | Biship et al. |
| 7,494,057 B2 | 2/2009 | Lasch et al. |
| 7,502,758 B2 | 3/2009 | Burke |
| 7,503,503 B2 | 3/2009 | Riedl et al. |
| 7,506,806 B2 | 3/2009 | Bonalle et al. |
| 7,530,491 B2 | 5/2009 | Lasch et al. |
| 7,533,063 B2 | 5/2009 | Kianian |
| 7,588,184 B2 | 9/2009 | Gandel et al. |
| 7,591,416 B2 | 9/2009 | Blossom |
| D602,522 S | 10/2009 | Field et al. |
| D602,986 S | 10/2009 | Skelding et al. |
| 7,606,730 B2 | 10/2009 | Antonucci |
| 7,627,531 B2 | 12/2009 | Breck et al. |
| 7,660,763 B1 | 2/2010 | Brake, Jr. et al. |
| 7,676,425 B1 | 3/2010 | Noles |
| 7,707,111 B2 | 4/2010 | Brake, Jr. et al. |
| 7,766,244 B1 | 8/2010 | Field et al. |
| 7,870,071 B2 | 1/2011 | Gupta |
| 2001/0001856 A1 | 5/2001 | Gould et al. |
| 2001/0002487 A1 | 5/2001 | Grawrock et al. |
| 2001/0014868 A1 | 8/2001 | Herz et al. |
| 2001/0027389 A1 | 10/2001 | Beverina et al. |
| 2001/0032312 A1 | 10/2001 | Runje et al. |
| 2001/0034647 A1 | 10/2001 | Marks et al. |
| 2001/0034663 A1 | 10/2001 | Teveler et al. |
| 2001/0034684 A1 | 10/2001 | Cushing et al. |
| 2001/0037276 A1 | 11/2001 | Kelly et al. |
| 2001/0038033 A1 | 11/2001 | Habib |
| 2001/0044733 A1 | 11/2001 | Lee et al. |
| 2001/0047332 A1 | 11/2001 | Gonen-Friedman et al. |
| 2001/0047336 A1 | 11/2001 | Maycock et al. |
| 2001/0051917 A1 | 12/2001 | Bissonette et al. |
| 2002/0010591 A1 | 1/2002 | Pomerance |
| 2002/0013751 A1 | 1/2002 | Facciani et al. |
| 2002/0019793 A1 | 2/2002 | Frattalone |
| 2002/0026416 A1 | 2/2002 | Provinse |
| 2002/0026418 A1 | 2/2002 | Koppel et al. |
| 2002/0026575 A1 | 2/2002 | Wheeler et al. |
| 2002/0029191 A1 | 3/2002 | Ishibashi et al. |
| 2002/0032609 A1 | 3/2002 | Wilkman |
| 2002/0035527 A1 | 3/2002 | Corrin |
| 2002/0038289 A1 | 3/2002 | Lawlor et al. |
| 2002/0046089 A1 | 4/2002 | Zorn |
| 2002/0059139 A1 | 5/2002 | Evans |
| 2002/0062249 A1 | 5/2002 | Iannacci |
| 2002/0062279 A1 | 5/2002 | Behrenbrinker et al. |
| 2002/0065712 A1 | 5/2002 | Kawan et al. |
| 2002/0065720 A1 | 5/2002 | Carswell et al. |
| 2002/0069122 A1 | 6/2002 | Yun |
| 2002/0070976 A1 | 6/2002 | Tanner et al. |
| 2002/0073030 A1 | 6/2002 | Offer |
| 2002/0073042 A1 | 6/2002 | Maritzen et al. |
| 2002/0074401 A1 | 6/2002 | Madani |
| 2002/0077964 A1 | 6/2002 | Brody et al. |
| 2002/0082990 A1 | 6/2002 | Jones |
| 2002/0087373 A1 | 7/2002 | Dickstein et al. |
| 2002/0091632 A1 | 7/2002 | Turock et al. |
| 2002/0091649 A1 | 7/2002 | Anvekar et al. |
| 2002/0099586 A1 | 7/2002 | Bladen et al. |
| 2002/0099667 A1 | 7/2002 | Diamandis et al. |
| 2002/0103852 A1 | 8/2002 | Pushka |
| 2002/0111886 A1 | 8/2002 | Chenevich et al. |
| 2002/0111916 A1 | 8/2002 | Coronna et al. |
| 2002/0117541 A1 | 8/2002 | Biggar et al. |
| 2002/0129221 A1 | 9/2002 | Borgia et al. |
| 2002/0133461 A1 | 9/2002 | Ramachandran |
| 2002/0138418 A1 | 9/2002 | Zarin et al. |
| 2002/0145039 A1 | 10/2002 | Carroll |
| 2002/0147645 A1 | 10/2002 | Alao et al. |
| 2002/0147683 A1 | 10/2002 | Capobianco et al. |
| 2002/0152168 A1 | 10/2002 | Neofytides et al. |
| 2002/0156723 A1 | 10/2002 | Lilly et al. |
| 2002/0161699 A1 | 10/2002 | Okamoto et al. |
| 2002/0161702 A1 | 10/2002 | Milberger et al. |
| 2002/0165771 A1 | 11/2002 | Walker et al. |
| 2002/0165829 A1 | 11/2002 | Jones et al. |
| 2002/0169719 A1 | 11/2002 | Dively et al. |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178063 A1 | 11/2002 | Gravelle et al. |
| 2002/0190123 A1 | 12/2002 | Anvekar et al. |
| 2002/0194098 A1 | 12/2002 | Stiff et al. |
| 2002/0194139 A1 | 12/2002 | Kianian |
| 2002/0198848 A1 | 12/2002 | Michener |
| 2003/0010831 A1 | 1/2003 | Ye |
| 2003/0018613 A1 | 1/2003 | Oytac |
| 2003/0023549 A1 | 1/2003 | Armes et al. |
| 2003/0028481 A1 | 2/2003 | Flitcroft et al. |
| 2003/0028483 A1 | 2/2003 | Sanders et al. |
| 2003/0031321 A1 | 2/2003 | Mages |
| 2003/0034388 A1 | 2/2003 | Routhenstein et al. |
| 2003/0040927 A1 | 2/2003 | Sato et al. |
| 2003/0040959 A1 | 2/2003 | Fei et al. |
| 2003/0046542 A1 | 3/2003 | Chen et al. |
| 2003/0055780 A1 | 3/2003 | Hansen et al. |
| 2003/0055782 A1 | 3/2003 | Slater |
| 2003/0061168 A1 | 3/2003 | Routhenstein |
| 2003/0061172 A1 | 3/2003 | Robinson |
| 2003/0065624 A1 | 4/2003 | James et al. |
| 2003/0074167 A1 | 4/2003 | Browne et al. |
| 2003/0074290 A1 | 4/2003 | Clore |
| 2003/0078815 A1 | 4/2003 | Parsons |
| 2003/0085272 A1 | 5/2003 | Andrews et al. |
| 2003/0085286 A1 | 5/2003 | Kelley et al. |
| 2003/0105714 A1 | 6/2003 | Alarcon-Luther et al. |
| 2003/0110111 A1 | 6/2003 | Nalebuff et al. |
| 2003/0120571 A1 | 6/2003 | Blagg |
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0149660 A1 | 8/2003 | Canfield |
| 2003/0154163 A1 | 8/2003 | Phillips et al. |
| 2003/0167218 A1 | 9/2003 | Field et al. |
| 2003/0167220 A1 | 9/2003 | Schoen et al. |
| 2003/0177079 A1 | 9/2003 | Krajewski et al. |
| 2003/0182218 A1 | 9/2003 | Blagg |
| 2003/0182246 A1 | 9/2003 | Johnson et al. |
| 2003/0187787 A1 | 10/2003 | Freund |
| 2003/0195842 A1 | 10/2003 | Reece |
| 2003/0200179 A1 | 10/2003 | Kwan |
| 2003/0204421 A1 | 10/2003 | Houle et al. |
| 2003/0205616 A1 | 11/2003 | Graves |
| 2003/0213843 A1 | 11/2003 | Jackson |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0222136 A1 | 12/2003 | Bolle et al. |
| 2003/0229525 A1 | 12/2003 | Callahan et al. |
| 2004/0010462 A1 | 1/2004 | Moon et al. |
| 2004/0024693 A1 | 2/2004 | Lawrence |
| 2004/0029569 A1 | 2/2004 | Khan et al. |
| 2004/0049451 A1 | 3/2004 | Berardi et al. |
| 2004/0049452 A1 | 3/2004 | Blagg |
| 2004/0064332 A1 | 4/2004 | Zou et al. |
| 2004/0064402 A1 | 4/2004 | Dreyer et al. |
| 2004/0078328 A1 | 4/2004 | Talbert et al. |
| 2004/0088236 A1 | 5/2004 | Manning |
| 2004/0088238 A1 | 5/2004 | Gilson et al. |

(56) References Cited

U.S. PATENT DOCUMENTS

| | | |
|---|---|---|
| 2004/0094624 A1 | 5/2004 | Fernandes et al. |
| 2004/0103431 A1 | 5/2004 | Davenport et al. |
| 2004/0117202 A1 | 6/2004 | Winklevoss et al. |
| 2004/0117300 A1 | 6/2004 | Jones et al. |
| 2004/0118914 A1 | 6/2004 | Smith et al. |
| 2004/0122736 A1 | 6/2004 | Strock et al. |
| 2004/0128186 A1 | 7/2004 | Breslin et al. |
| 2004/0128195 A1 | 7/2004 | Sorem |
| 2004/0128217 A1 | 7/2004 | Friedman et al. |
| 2004/0133787 A1 | 7/2004 | Doughty et al. |
| 2004/0149544 A1 | 8/2004 | Dal Ferro |
| 2004/0155101 A1 | 8/2004 | Royer et al. |
| 2004/0158517 A1 | 8/2004 | Mahaney et al. |
| 2004/0159700 A1 | 8/2004 | Khan et al. |
| 2004/0172350 A1 | 9/2004 | Atkinson et al. |
| 2004/0186773 A1 | 9/2004 | George et al. |
| 2004/0193539 A1 | 9/2004 | Sullivan |
| 2004/0210498 A1 | 10/2004 | Freund |
| 2004/0215507 A1 | 10/2004 | Levitt et al. |
| 2004/0215963 A1 | 10/2004 | Kaplan |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0252012 A1 | 12/2004 | Beenau et al. |
| 2005/0021353 A1 | 1/2005 | Aviles et al. |
| 2005/0021457 A1 | 1/2005 | Johnson et al. |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0060260 A1 | 3/2005 | Masuda et al. |
| 2005/0065877 A1 | 3/2005 | Cleary et al. |
| 2005/0077349 A1 | 4/2005 | Bonalle et al. |
| 2005/0080726 A1 | 4/2005 | Krajewski et al. |
| 2005/0086160 A1 | 4/2005 | Wong et al. |
| 2005/0086167 A1 | 4/2005 | Brake, Jr. et al. |
| 2005/0091492 A1 | 4/2005 | Benson et al. |
| 2005/0102228 A1 | 5/2005 | Srinivasan et al. |
| 2005/0108152 A1 | 5/2005 | Tsoa Lee et al. |
| 2005/0114883 A1 | 5/2005 | Nagai et al. |
| 2005/0116024 A1 | 6/2005 | Beenau et al. |
| 2005/0119979 A1 | 6/2005 | Murashita et al. |
| 2005/0125343 A1 | 6/2005 | Mendelovich |
| 2005/0167488 A1 | 8/2005 | Higgins et al. |
| 2005/0171842 A1 | 8/2005 | Tien et al. |
| 2005/0179251 A1 | 8/2005 | Wagoner et al. |
| 2005/0189427 A1 | 9/2005 | Brown et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2005/0289044 A1 | 12/2005 | Breslin et al. |
| 2006/0020542 A1 | 1/2006 | Litle |
| 2006/0020558 A1 | 1/2006 | Bonalle et al. |
| 2006/0026092 A1 | 2/2006 | Klein et al. |
| 2006/0036543 A1 | 2/2006 | Blagg et al. |
| 2006/0036553 A1 | 2/2006 | Gupta |
| 2006/0039733 A1 | 2/2006 | Meyerhofer |
| 2006/0041540 A1 | 2/2006 | Shannon |
| 2006/0047573 A1 | 3/2006 | Mitchell et al. |
| 2006/0074794 A1 | 4/2006 | Nespola, Jr. |
| 2006/0085334 A1 | 4/2006 | Murphy |
| 2006/0106696 A1 | 5/2006 | Carlson |
| 2006/0116903 A1 | 6/2006 | Becerra |
| 2006/0116955 A1 | 6/2006 | Strayer et al. |
| 2006/0122918 A1 | 6/2006 | Graboske et al. |
| 2006/0131869 A1 | 6/2006 | Brignull |
| 2006/0157557 A1 | 7/2006 | Lee et al. |
| 2006/0208060 A1 | 9/2006 | Mendelovich et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0259390 A1 | 11/2006 | Rosenberger |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0063025 A1 | 3/2007 | Blossom |
| 2007/0078719 A1 | 4/2007 | Schmitt et al. |
| 2007/0136211 A1 | 6/2007 | Brown et al. |
| 2007/0156530 A1 | 7/2007 | Schmitt et al. |
| 2007/0168265 A1 | 7/2007 | Rosenberger |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0265924 A1 | 11/2007 | Schwarz |
| 2008/0005018 A1 | 1/2008 | Powell |
| 2008/0010202 A1 | 1/2008 | Schwarz |
| 2008/0027841 A1 | 1/2008 | Eder |
| 2008/0177659 A1 | 7/2008 | Lacey et al. |
| 2008/0187770 A1 | 8/2008 | Funicelli et al. |
| 2008/0230600 A1 | 9/2008 | Black et al. |
| 2008/0245865 A1 | 10/2008 | Mosteller |
| 2008/0277465 A1 | 11/2008 | Pletz et al. |
| 2008/0301041 A1 | 12/2008 | Bruk |
| 2009/0043651 A1 | 2/2009 | Schwarz |
| 2009/0048972 A1 | 2/2009 | Bierer et al. |
| 2009/0112658 A1 | 4/2009 | Mullen et al. |
| 2009/0150370 A1 | 6/2009 | Christensen et al. |
| 2009/0157519 A1 | 6/2009 | Bishop et al. |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2009/0313131 A1 | 12/2009 | Giordano |
| 2010/0030675 A1 | 2/2010 | Hanan et al. |
| 2010/0030697 A1 | 2/2010 | Goodrich et al. |

FOREIGN PATENT DOCUMENTS

| | | |
|---|---|---|
| JP | 53-118104 | 10/1978 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-259933 | 9/2002 |
| JP | 2002-366015 | 12/2002 |
| JP | 2005-246658 | 9/2005 |
| JP | 2008-015071 | 1/2008 |
| WO | WO 97-20692 | 6/1997 |
| WO | WO 98-10368 | 3/1998 |
| WO | WO 99-54841 | 10/1999 |
| WO | WO 01-88659 | 11/2001 |
| WO | WO 2005-101975 | 11/2005 |
| WO | WO 2006-060370 | 6/2006 |
| WO | WO 2006-105092 | 10/2006 |
| WO | WO 2006-116772 | 11/2006 |
| WO | WO 2007-115725 | 10/2007 |
| WO | WO 2008-021381 | 2/2008 |
| WO | WO 2008-021382 | 2/2008 |
| WO | WO 2009-023817 | 2/2009 |

OTHER PUBLICATIONS

Anonymous, Coca-Cola ATM Money Cards, Retrieved from the Internet at: http:-- www.cardweb.com-cardtrak-news-cf4_4a_97. html, Apr. 4, 1997, ACS 012.

Abstract to 2007 JPMorgan Chase Disaster Response Card National Strategy Plan Abstract, Jan. 26, 2007.

Siegel, Joel G., et. al., Accounting Handbook, Second Edition (1995).

The State of Arkansas, Arkansas Code of 1987 Annotated (1999).

(56) References Cited

OTHER PUBLICATIONS

Anonymous, Association of Inventive Gift Certificate Suppliers, vol. 169, No. 8, Aug. 1, 1995.
Authorization of Financial Agent and Terms of Performance, Debit Card Application for Houston, Texas, Sep. 1991, acs00277412.
E-Loan, Auto Loan Rates, retrieved from the Internet on Sep. 30, 2008.
Plotnick, Jennifer, Bakersfield California Investors Explore Buying Rental Property Apr. 11, 2004.
Block, Valerie, Blockbuster running test of a stored value card, The American Banker, Sep. 1, 1995.
Board of Governors of the Federal Reserve System—Report to the Congress on the Application of the Electronic Fund Transfer Act to Electronic Stored-Value Products, May 1997, acs00098020.
Cheney, How Effective Were the Financial Saftey Nets in the Aftermath of Katrina, HurricaneKatrinaJan06, Jan. 2006.
Kutler, Cash Card Creator Looking Beyond Mondex, Feb. 9, 1995.
Bank, Cash, Check,Charge—What's Next?, Seattle Times, Mar. 6, 1995.
Haddad, Charles, et. al., Congratulations, Grads—You're Bankrupt; A Marketing Blitz Buries Kids in Plastic and Debt, May 21, 2001.
cardweb.com, Daily Payment Card News (2004).
Sherer, Paul M., Deals & Deal Makers: Web Ventures Seek to Facilitate Business Credit, Private Equity, Nov. 8, 1999.
Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Debit and Stored Value Cards for Government: A Growing Trend but States Could Do More, A Survey and White paper of The EBT Industry Council, Nov. 2006.
Direct Payment Card, International EBT Pilot Evaluation Pilot Evaluation—Argentina, Jan. 1996, acs00277456.
Lennox, Graeme, Don't Be Tempted by the Urge to Splurge: Zero Rates Sound Great But You'll Pay Dearly in the End, Jul. 2001.
Electronic Purse, SCIA (Smart Card Industry Association), About Smart Cards, www.scia.org, printed Feb. 23, 2001, 1 page.
FOIA # 09-02-12 Responsive Records Book #11, Mar. 12, 2009, acs00279715.
FOIA # 09-02-12 Responsive Records Book #2, Mar. 12, 2009, acs00277515.
FOIA # 09-02-12 Responsive Records Book #3, Mar. 12, 2009, acs00277531.
FOIA # 09-02-12 Responsive Records Book #5, Mar. 12, 2009, acs00278229.
FOIA # 09-02-12 Responsive Records Book #7, Mar. 12, 2009, acs00278754.
Roberts, Leigh, Fnb and Nedcor Launch Into the New Era of Smart Card Banking Nov. 15, 1998.
E-Loan, Frequently Asked Questions (2001).
Ostroff, Jeff, Guide to Buying New Cars, Used Cars, Dealer Scams, Feb. 2001, p. 1-7.
Hargreaves, The Evaluation of the Expanded EBT Demonstration in Maryland, Final Report, May 1994, acs00092018.
Request for Information submitted to Department of Health and Human Services by JPMorgan Electronic Financial Services, Request for Information for EBT Services, Aug. 10, 2006.
Alaska Housing Finance Corporation Quarterly Unaudited Financial Statements with Summarized Financial Information for Jun. 30, 2004, and Request for Information Banking Services, Mar. 31, 2005, Bates Nos. ACS-00000143-ACS-00000231.
Kilian-Kehr, Roger, Kilian-Kehr, Mobile Security with Smartcards, Dissertation, Apr. 8, 2002.
Statement of Brian Kibble-Smith, House Committee on Ways and Means, Apr. 5, 2006.
Kleege, Stephen, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3).
Lewis, David, Mortgage Lending Optimized, IntternetWeek, Issue 858, Apr. 23, 2001.
Power, Denise, Loehmann's Compiles Shopper Data Via Credit Card, vol. 28, No. 3, pp. 6, Jan. 1998.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
Feldman, Judy, Pay by Check Over the Phone or Net, Oct. 1999.
Youll, James, Peer to Peer Transactions in Agent Mediated Electronic Commerce, Aug. 2001.
Wolf, Harold A., Personal Finance, Sixth Edition, (1981).
Sessums, Unbanked Citizens Draw Government Attention, vol. 9, No. 4, (1997) acs00280762.
Unknown, Smart Cards Forging Into Credit Card Market, vol. 10, Issue 6, Apr. 3, 1995.
American Bankers Association, The Bank Credit Card Business, (1996).
Nilson, H. Spencer, The Nilson Report, Nov. 1998.
Anonymous, Two Chips Can Be Better Than One, May 2001.
Unknown, Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997.
Yee, Bennet, Using Secure Coprocessors, May 1994.
Vivo Tech, ViVOtech, Inc. RF-Based Contactless Payment: A more convenient way to pay, White Paper—Version 2.0, Apr. 2004.
Wood, John et al., Wood, et al., Electronic Transfer of Government Benefits, Federal Reserve Bulletin, pp. 203-217, Apr. 1997.
Bowen, Cathy, Welfare Agencies Seek Aid From Smart Cards, p. 74, Oct. 2002.
Wells Fargo Blazes New Trail for Homeowners, Oct. 2002.
Wenninger et al., The Electronic Purse, Current Issues in Economics and Finance, vol. 1, No. 1, Apr. 1995, acs00098037.
Neumann, An Enhanced Neural Network Technique for Software Risk Analysis, IEEE Transactions on Software Engineering, vol. 28, No. 9, Sep. 1, 2002, pp. 904-912.
Vandenengel, Cards on the Internet: Advertising on a $3 Bill, Industry Intelligence, Feb. 1, 1995, pp. 46-48.
Morgan et al., Categorizing Risks for Risk Ranking, vol. 20, No. 1, Jun. 22, 2005, pp. 49-58.
Guidotti, Comparing Environmental risks: A Consultative Approach to Setting Priorities at the Community Level, Public Health Rev 1994, vol. 22, Jun. 16, 2005, pp. 321-337.
Hight, Jim, Consulting Services, www.strategies-tactics.com.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Hamey, Kenneth, Home Asset Management Accounts Link Mortgages Equity Lines, Oct. 5, 2002.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Rossman, Kenneth, Summary Appraisal of Real Property, Feb. 15, 2002.
Langheinrich et al., Unintrusive Customization Techniques for Web Advertising, Computer Networks, vol. 31, 1999, pp. 1259-1272.
Antoine Coulton, "Incentives field moving to card-based series 14", American Banker, Mar. 26, 1998.
Credit Card News, "A store card issuer looks for lift from electronic gift certificates", Feb. 1, 1995.
Business Travel News, "Maritz gets mastercard's stamp of approval", Aug. 19, 1996.
Debit Card News, vol. 2, Issue 2, "Boatman's floats stored value into the employee incentive waters", Jul. 16, 1996.
Mickey Meece, "Boatman's prepaid cards for worker-incentive firm", American Banker, Jul. 2, 1996.
Card News, vol. 6, No. 25, "D.C. Area Safeway stores look for increase in sales volume and revenue with cards", Dec. 1991.

(56) References Cited

OTHER PUBLICATIONS

Spurgin, "Sopininmon! or What's happening in the retail credit card environment", Credit World Journal, Apr. 1997.

AT&T Marketing, "Universal card free lifetime membership extended 3 months", www.att.com/press/0297/970217.csa.html, Dec. 4, 1990.

Chain Store Age Executive with Shopping Center Age, "More retailers turn to co-branding", Feb. 1, 1995.

Introducing SpendingMoney(TM), Armetta: Marketing & Design Product Concept Report, Oct. 9, 1996.

First USA Platinum Connect, First USA Bank, First USA Promotional Mailing, Oct. 1997.

Introducing the First USA Platinum Connect Card, First USA Promotional Mailing, Dec. 1997.

Here's the calling convenience you asked for: 1-800-call- AT&T . . . For All Calls, Appendix A: for Card Carriers.

Beth Piskora, Debit Cards Seen Poised for New Markets, American Banker, pp. 16, Mar. 7, 1995.

Nick Rosen, Cash Just Isn't Flexible Enough: Shops of the Future Will Only Take Cards, Daily Express: Technology Section, Feb. 10, 1995.

Phil Britt, Competing in Auto Lending, America's Community Banker, vol. 5, No. 11, pp. 33-37, Nov. 1, 1996.

Miriam Krenin Souccar, Smart Cards: 1st Union Smart Card Pilot Enlists a Second Army Base, American Banker, Mar. 31, 1999.

CardEx Incentives, Apr. 6, 1999, 15 pages, <www.cardex.com>.

Associates First Capital Corporation, Hoover's Inc., The Industry Standard: The News Magazine of the Internet Economy, 6 pages, Apr. 6, 1999, <thestandard.net/companies/company-display>.

Jeffrey Lacker, Stored Value Cards: Costly Private Substitutions for Government Currency, Economic Quarterly, 1996, vol. 82, No. 3, 17 pages.

The Evolution of a New Consumerism, Chain Store Age, vol. 73, 4 pages, Jun. 1997.

Lisa Fickenscher, Amex Prepaid Offering is Latest Card for Firms Regarding Employees, American Banker, vol. 161, No. 151, 2 pages, Aug. 8, 1996.

Incentives Firms Find Debit Cards for Firms a Rewarding Experience, Debit Card News, vol. 3, No. 1, Nov. 28, 1997, 3 pages.

Welcome to Swiftgift, SwiftGift, <www.swiftgiftcard.com>, Dec. 8, 1997, 10 pages.

SwiftGift "Wows" Internet Shoppers, Key, PR Newswire, <www.key.com/swiftgift/home.html>, Feb. 2, 1998, 2 pages.

Lucy Lzarony, Stuck for a gift? Give a prepaid credit card, Bankrate.com, <www.nakrate.com>, Dec. 21, 1998, 2 pages.

A Store Card Issuer Looks for Lift From Electronic Gift Certificates, Credit Card News, Feb. 1, 1995, 2 pages.

Maritz Gets MasterCard's Stamp of Approval, Business Travel News, Aug. 19, 1996, 2 pages.

Boatmen's Floats Stored Value into the Employee Incentive Waters, Debit Card News, vol. 2, Issue 2, Jul. 16, 1996, 3 pages.

Mickey Meece, Boatmen's Prepaid Cards for Worker-Incentive Firm, American Banker, Jul. 2, 1996, 1 page.

D.C. Area Safeway Stores Look for Increase in Sales Volume and Revenue with Cards, Card News, vol. 6, No. 25, Dec. 1991, 3 pages.

Ralph E. Spurgin, Sopininmon! or What's Happening in the Retail Credit Card Environment, Credit World Journal, vol. 85, No. 4, Mar. 1, 1997, 7 pages.

AT&T Marketing, Universal Card Free Lifetime Membership Extended 3 Months, AT&T News Release, Dec. 4, 1990, 2 pp., <www.att.com/press/0297/970217.csa.html>.

More Retailers Turn to Co-Branding, Chain Sore Age Executive with Shopping Center Age, Feb. 1, 1995, vol. 71, No. 2, pp. 1-3.

Introducing SpendingMoney(TM), Armetta: Maketing & Design, Product Concept Report, Oct. 9, 1996, 15 pages.

First USA Platinum Connect Card, First USA, Promotional Mailing, Dec. 1997, 6 pages.

Here's the calling convenience you asked for: 1-800-call- ATT....For All Calls, AT&T, Appendix A: for Card Carriers, 1999, 6 pages.

Beth Piskora, Debit Cards Seen Poised for New Markets, American Banker, Mar. 7, 1995, 1 page.

Nick Rosen, Cash Just Isn't Flexible Enough: Shops of the Future Will Only Take Cards, Daily Express: Technology Section, Feb. 10, 1995, 1 page.

Phil Britt, Competing in Auto Lending, America's Community Banker, vol. 5, No. 11, Nov. 1, 1996, 7 pages.

News Release, AT&T, New 1-800-CALL-ATT campaign promotes one number for all calls, Monday Feb. 17, 1997, 2 pages.

Lucy Lazarony, bankrate.com, Stuck for a gift? Give a prepaid credit card, Dec. 21, 1998. 2 pages.

Antoinette Coulton, Incentives field moving to card-based awards series: 14, American Banker, Mar. 26, 1998, pp. 1-3.

MULTIPLE ACCOUNT ADVANCED PAYMENT CARD AND METHOD OF ROUTING CARD TRANSACTIONS

CROSS REFERENCE TO RELATED APPLICATIONS

This patent application is a divisional of U.S. patent application Ser. No. 13/275,927, filed on Oct. 18, 2011, which is a continuation of U.S. patent application Ser. No. 11/846,842, filed on Aug. 29, 2007, which is a continuation of U.S. patent application Ser. No. 10/201,589, filed Jul. 24, 2002, which claims priority to U.S. Provisional Application No. 60/307,179, filed Jul. 24, 2001, each of which are hereby incorporated by reference herein in their entireties.

FIELD OF THE INVENTION

The present invention relates generally to financial account cards such as credit cards, debit cards and stored value cards. More specifically, the invention includes a multipurpose card having the attributes of a credit card, a debit card and a stored value card. The invention relates to financial account cards that access multiple accounts.

BACKGROUND OF THE INVENTION

Many point-of-sale and other financial transactions take place using card transactions. In these transactions, to provide payment, a card user presents a credit card, a bank, debit or automated teller machine (ATM) card, or possibly a stored value card. The cards presented are conventionally of one and only one of these types. The cards presented typically access only a single account.

For example, a user may present a credit card to pay from a credit account maintained by the issuer of the card. The credit card is typically embossed with a unique account number, the cardholder's name, and the expiration date of the card. Data is also encoded on a magnetic stripe on the card. The data identifies the cardholder's account and may be accessed by magnetic card readers connected to a credit card processing system.

An ATM card is used in similar manner. The ATM card is a plastic card that is typically embossed with an account number and the holder's name. The ATM card also includes data encoded on a magnetic stripe of the card. The data identifies the cardholder's account and may be accessed by a magnetic card reader to use the card.

A stored value card is typically used to pay for a specific product or service. The stored value card includes data regarding a limited use account that is limited to providing payment for a specific product or service or for products and services at a specific merchant. The data permits processing equipment at the point of sale to determine the value of funds in the account.

In a typical card payment transaction, for example a credit card transaction, a buyer presents a credit card to a merchant at the point of sale. The apparatus at the point of sale reads account information from the card and passes this information along with the transaction data to the merchant's card processing system for approval from the card processor or qualifier that maintains the buyer's account. This approval transmission typically passes through a chain of processors. The merchant's card processing system typically interacts with a merchant acquirer's system. The merchant may also use a third party pre-router to process card transactions. The merchant acquirer is a middleman that provides card services to businesses that accept card transactions. The merchant acquirer typically sends the data to a card association or network such as Visa, Mastercard, American Express and others. The card association then obtains approval from the processing or qualifying institution for the individual card. The approval (or denial) is transmitted back down through this chain of processors. This chain of processing systems is also used during settlement of the transaction to provide transfer of the funds from the issuing institution to the merchant's account.

SUMMARY OF THE INVENTION

The present invention provides a single card having the benefit of accessing multiple accounts and if desirable multiple types of accounts. This is accomplished through the routing of card transactions based on additional information beyond the single account number read at the time of sale. The financial card of the present invention may have the benefits of a credit card, a bank card, and a stored value card. This multiple account advanced payment card may be encoded with credit card account, bank account, and stored value account information. The information is encoded on the card in manner that is machine readable in systems that read credit cards, in a systems that reads bank cards, and in at least one system that reads stored value cards. The multiple account payment card may also be processed through a system that permits the card to access different accounts. The multiple account advanced payment card enables the issuer of the card to maintain multiple types of accounts for access by the cardholder. The card enables the cardholder to employ a single card to conduct transactions by accessing different accounts.

The use of the multiple account advanced payment card permits the cardholder to enjoy the benefits of multiple types of accounts while carrying a single card. This card beneficially further allows a card issuer to route transactions to a particular type of account based on the particular transaction and other factors. This enables the multiple accounts accessed by the multiple purpose card to complement one another and to provide flexibility to the cardholder to complete a wide variety of transactions.

Advantages of this invention in addition to those described above are apparent from the following detailed description of the preferred embodiment of the invention.

DETAILED DESCRIPTION OF THE PREFERRED EMBODIMENTS

A financial card of the present invention appears similar to a conventional credit card or debit card. For example, the multiple account advanced payment card may have the form, fit and function of a conventional credit, bank or stored value card. In a first embodiment, the multiple purpose card is an embossed plastic card including machine readable data. The card is styled to identify to the cardholder the bank or other financial institution that issued the card. The card is embossed with identification information that renders the card unique to the cardholder. Typically, the identification information includes the cardholder's name and an account number of an account held by the user. The account number typically identifies a credit account to permit the card to be used as credit card in all transactions in which a credit card account number is required to be read or recorded from the embossed account number on the card.

Figure 1:
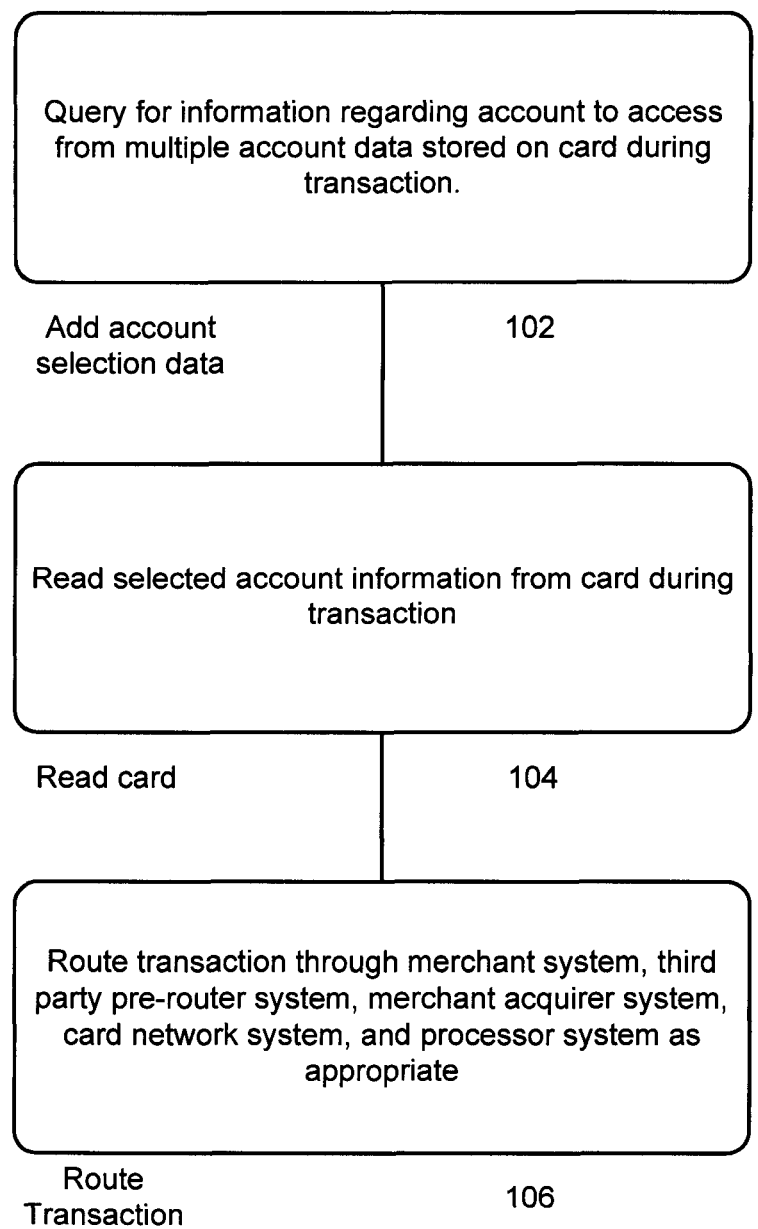
FIG. 1 is a basic flowchart of a method of accessing multiple accounts from a single card according to a first embodiment of the invention.

The machine readable data included on the card includes data pertains to different accounts. An advantage to encoding information of different accounts is that a card reader capable of selectively reading multiple accounts may access the existing card processing system to access any account encoded on the card. A method according to this embodiment is shown in FIG. 1, which refers to processing a transaction for a card wherein data of multiple accounts is stored on a magnetic stripe on the card. Data input is acquired at the point of sale as shown at 102. The magnetic stripe is read by card readers based on the data input as shown at 104. For example, a card reading system would query the user which account (or what type of account) should be accessed at 102. Based on data input in response to the query, the card reader will read the selected account data at 104. In this embodiment, additional data is input at the point of sale to select from the multiple account numbers stored on the card. The transaction is processed normally based on the selected account number as shown at 106.

Preferably, the magnetic stripe on which the account numbers are stored conforms to industry standards. These standards provide the location of magnetic data on the card so that standard readers may access the stored data. The standards provide for the data to be located on multiple tracks on the magnetic stripe. On a typical credit or bank card, the storage capacity of the magnetic stripe is significantly greater than the account data stored on the card. Typically data is only stored in tracks 1 and 2 of a magnetic stripe that includes 3 or 4 tracks. Therefore in the card according to this embodiment of the invention, the excess capacity of the magnetic stripe is employed to store account data for multiple accounts. The different accounts may be accessed by the single card. Thus, the cardholder is able to use a single card in wide variety of financial transactions. For example, a card may have account data pertaining to a credit card account stored on a first track on the card, account data pertaining to debit account stored on a second track, data pertaining to a first stored value account in a third track, and data pertaining to second stored value account in a fourth track.

The different types of accounts that may be linked to the multiple function card of the present invention include credit card accounts; bank, debit or automated teller machine (ATM) accounts; and stored value accounts. The financial institution issuing the card maintains accounts for the cardholder that are each accessed by the card so that the card may have all the functions of a credit card, all the functions of a bank, debit, or ATM card, and all the function of a stored value card. The machine-readable data on the card includes account identification data in a format that is readable by credit card readers. Accordingly, the card of this embodiment may function as a credit card in transactions in which the card reader is configured to search for credit card account data without the query and responding data input. The card includes machine-readable data in a format that is readable by ATMs. Therefore, the card may function as a debit or ATM card in transactions in which the card reader is configured to search for bank or debit account information also without the query and responding data input.

In situations where a transaction may be accomplished through the use of either a credit card account or a debit to an account linked to a bank or ATM card, either account linked to the card of the present invention may be accessed. In a typical point-of-sale transaction, the cardholder must identify the card as a credit card or as a debit or ATM card before the card reader reads the card. According to the novel approach taken for the present invention, the user may select whether the card will function as a credit card or whether it will function as a debit or ATM card. Based on the selection of the cardholder, the account data will be read in either the form of a credit card account or in the form of a bank or other account to be debited. The transaction is processed by the merchant, and subsequently by the card issuer, based on the selection of the cardholder.

As discussed above, the card of this embodiment is useable in a financial card processing system in which the user chooses the account (or account type) to be accessed during a particular transaction. The selection is made at the point of sale at the time of the transaction. The selection is input to the card reader. Based on the selection, the card reader reads the appropriate account information. The transaction is processed based on the account information read. For example, a card of this embodiment may have credit information account encoded in a first location on the magnetic stripe of the card and debit account information encoded in a second location on the magnetic stripe. At the time of use, the card reader is programmed to request input regarding whether the first account or the second account is to be accessed. If the user selects the first account and then swipes the card, the credit account information is read from the first location. The card reader and point of sale processing terminal sends the transaction information with the credit account information to the processor. The processor routes the transaction to the card issuing institution and the selected account is debited. If the user selects the second account, the debit account information is read from the second location and ultimately passed to the issuing institution, which debits the selected account.

The choice of which type of account to be accessed may also be made automatically in certain situations. The card issuer is able to route transactions through a chain of processors based on an appropriate type of account based on transaction data. In the scenario in which the card is used to conduct a transaction where only credit cards are accepted, the card issuer will receive a query to authorize a credit card transaction through a credit card processing system. When the merchant settles this transaction, the card issuer will automatically process the transaction as a credit card transaction. Similarly, if the card is used in an ATM transaction, the card issuer will receive a query through an ATM network to debit the cardholder's account. In this scenario, the card issuer will automatically process the transaction as a bank or ATM transaction.

Figure 2:
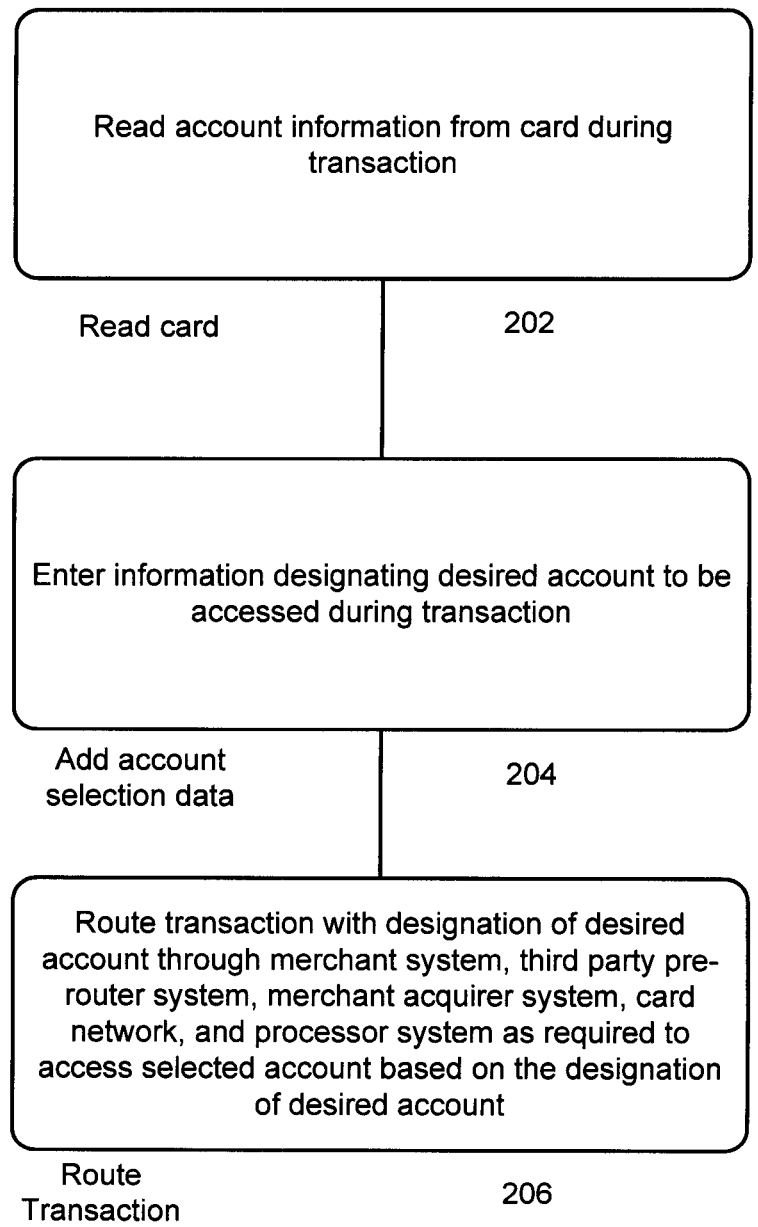
FIG. 2 is a basic flowchart of a method of accessing multiple accounts from a single card according to a second embodiment of the invention.

In a second embodiment, the card functions to access multiple accounts by routing the transaction based on additional data. The selection of an account (or type of account) is transmitted with the transaction data from the point-of-sale terminal. An advantage of this embodiment is that the card may be encoded with information in the form of a single account. The card itself may have many forms. The card need only to store the account number in a form that is readable during a transaction. Acceptable forms include the standard financial card described above, but may also include other electronically readable account number storage devices. The method of accessing multiple accounts according to this embodiment is shown in FIG. 2. The account information is read from the card by the point-of-sale terminal as shown at 202. The point-of-sale terminal is programmed to request input that indicates the account (or type of account) to be accessed as shown at 204. The point of sale terminal then transmits the transaction data, including data indicating the selected account. The transaction may then be routed by the merchant, the third party pre-router, the merchant acquirer, the card association or network, or the processor or qualifier based on the data input at the point of sale as shown at 206. The authorization decisions and subsequent settlement are based on the selection data transmitted.

According to one aspect of the second embodiment, a customer holds multiple accounts accessed through a card issuing institution. The card issuing institution issues to the customer a card encoded with alias master account information. The alias account information indicates that the account is with the card issuing institution and that a personal identification number (PIN) is required to access the account. The card issuing institution assigns a PIN to each of the customer's multiple accounts. When using the card, the card is swiped at the point-of-sale terminal to read the alias account information. The customer enters the PIN that corresponds to the account desired to be accessed. The point-of-sale terminal then processes the transaction using the alias account information and the PIN. This alias account information and the PIN are ultimately transmitted to the card issuing institution. The alias account information is sufficient to identify the card issuing institution and within the institution the customer. The card issuing institution makes authorization decisions and debits the correct actual account based on receiving a PIN that corresponds to one of the customer's multiple accounts. Thus, a specific account of the customer is accessed when the card issuing institution receives transaction data for the customer's alias account with the correct PIN designating a specific actual account.

It should be understood that although requesting a PIN is familiar to those presently engaging in card transactions, the data input at the point of sale may take other forms. For instance, the point-of-sale terminal may query the user to select an account or type of account. The response to the query would be transmitted with the transaction data. For example, a cardholder may have a credit, debit, and multiple stored value accounts associated with a master account number. The cardholder may select whether to conduct each card transaction by accessing the credit, debit, or one of the stored value accounts. This selection would be transmitted with the transaction data and be used to route the transmission through the correct network to debit the selected account. The data may be input by either the buyer or seller at the point-of-sale. For example, a salesperson accepting an in-house credit card for a transaction may respond to a query regarding the apparent risk of the transaction. Based on the factors such as the transaction amount, the type of merchandise purchased, the time, the demeanor of the purchaser, etc., the salesperson could designate the purchase as higher or lower risk. Based on this input, the transaction could be routed to either an account that could be approved by the merchant system or to an account that requires real-time approval from the qualifier.

Figure 3:
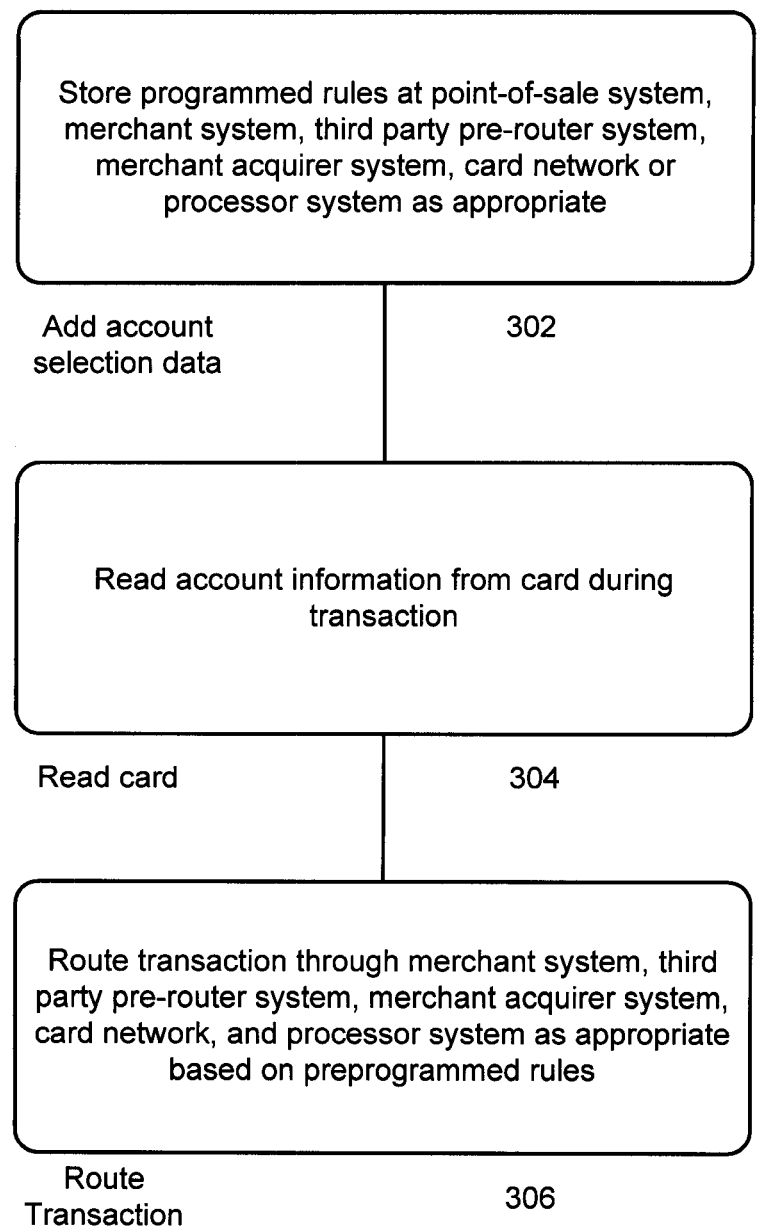
FIG. 3 is a basic flowchart of a method of accessing multiple accounts from a single card according to a third embodiment of the invention.

In a third embodiment, the card is linked to multiple accounts and the selection criteria are set in advance of using the card. Again, in this embodiment the card may take any form to store the account information, so long as it may be read during the transaction. In this embodiment additional data is stored at any point in the processing chain and used to route the transaction. An advantage of this embodiment is that the card is processed in the standard manner at the point-of-sale. A method of accessing multiple accounts according this embodiment is shown in FIG. 3. The customer has multiple accounts accessed through a card issuing institution. The card issuing institution issues to the customer a card with account information that identifies the card issuing institution and also identifies the customer to the card issuing institution. It is then determined how transactions using the card will be routed under certain conditions. For example, the customer and the card issuing institution may determine under what conditions each of the customer's multiple accounts will be accessed when the card is used by the customer.

The criteria used to conditionally route card transactions may include data regarding the transaction and the status of the cardholder's accounts at the time of the transaction. Data setting forth the conditions for each potential routing scenario are programmed into the processing system in the form of routing rules. These programmed rules are stored in the processing system in which the routing decision is made as shown at 302. The programmed rules may be stored at the merchant system, the third party pre-router, the merchant acquirer system, the card association or network's system, or the card processor or qualifier's system. The account information is read as usual at the point-of-sale as shown at 304. The transaction data is transmitted as discussed above. Such data may include the type of merchant or the type of goods or services involved in the transaction, the identity of the merchant, the location of the transaction, the amount of funds involved in the transaction, whether the transaction is a payment or credit, etc. The programmed rules may cause the transaction to be routed based on any of the data, or combinations of the data, received regarding the transaction as shown at 306. For example, credits from a certain class of merchant could be applied to increase the value of a selected stored value account of the customer. The card issuer may also route the transaction based on the status of an account. For example, transactions could be debited from a bank account when the balance exceeds a set value, but debited from a linked brokerage account when the balance of the bank account falls below the set value.

The additional data used to route the card transactions in this embodiment includes the conditional programmed rules that are predetermined and stored. The data may also include data not derived from the transaction itself that is stored and used in conditional routing decisions. For example, account status data, such as account balance ranges, may be provided from the account issuer to the card association or networks or to merchant acquirers for making routing decisions. Such data may be periodically updated throughout the processing system.

The embodiments of this invention permit a single card to function as different types of cards. The machine-readable data on the card may include data related to a prepaid stored value. The stored value can either be on the network in which the card is used or the value may be stored on the card. If the stored value is on the card, the data encoded on the card includes the current value of the stored value function of the card. The stored value data is altered as the cardholder spends down the value of the card. The data is stored on a portion of the card accessible to a card reader/writer for writing. Whether value is stored on the card or on the network, the transaction and account calculations may take place locally to the transaction. The stored value may be reduced without accessing data maintained by the card issuer. This enables the multiple purpose card to be used in transactions where data exchange with the card issuing institution is impossible or undesirable. However as the stored value account is linked by the card to other accounts such as the cardholder's credit and bank or debit accounts, the stored value account may be replenished through appropriate transactions when data exchange occurs with the institution that issues the card. The replenishment may be directed per automatic instructions or may be requested by the cardholder.

The institution issuing the card of the present invention enables the cardholder to use the multiple function card in a flexible manner. The institution has the flexibility to define the rules regarding how transactions are processed. The accounts can be effectively managed by the institution and the cardholder to ensure that the cardholder accounts are put to the best use. The institution can route any particular transaction to the appropriate account and may adjust the value of the stored value portion of the card according to instructions that maximize the ability of the cardholder to satisfactorily complete card transactions as desired.

The card issuing institution and the customer may also permit certain transactions to be ultimately routed to a final customer account based on a later selection by the customer. In this scenario the transaction is held by the card issuing institution or is posted to a general account of the customer. The customer, at some time after using the card, selects which account will be accessed. The selected account is finally debited or credited based on the transaction data and the subsequent customer selection.

Figure 4:
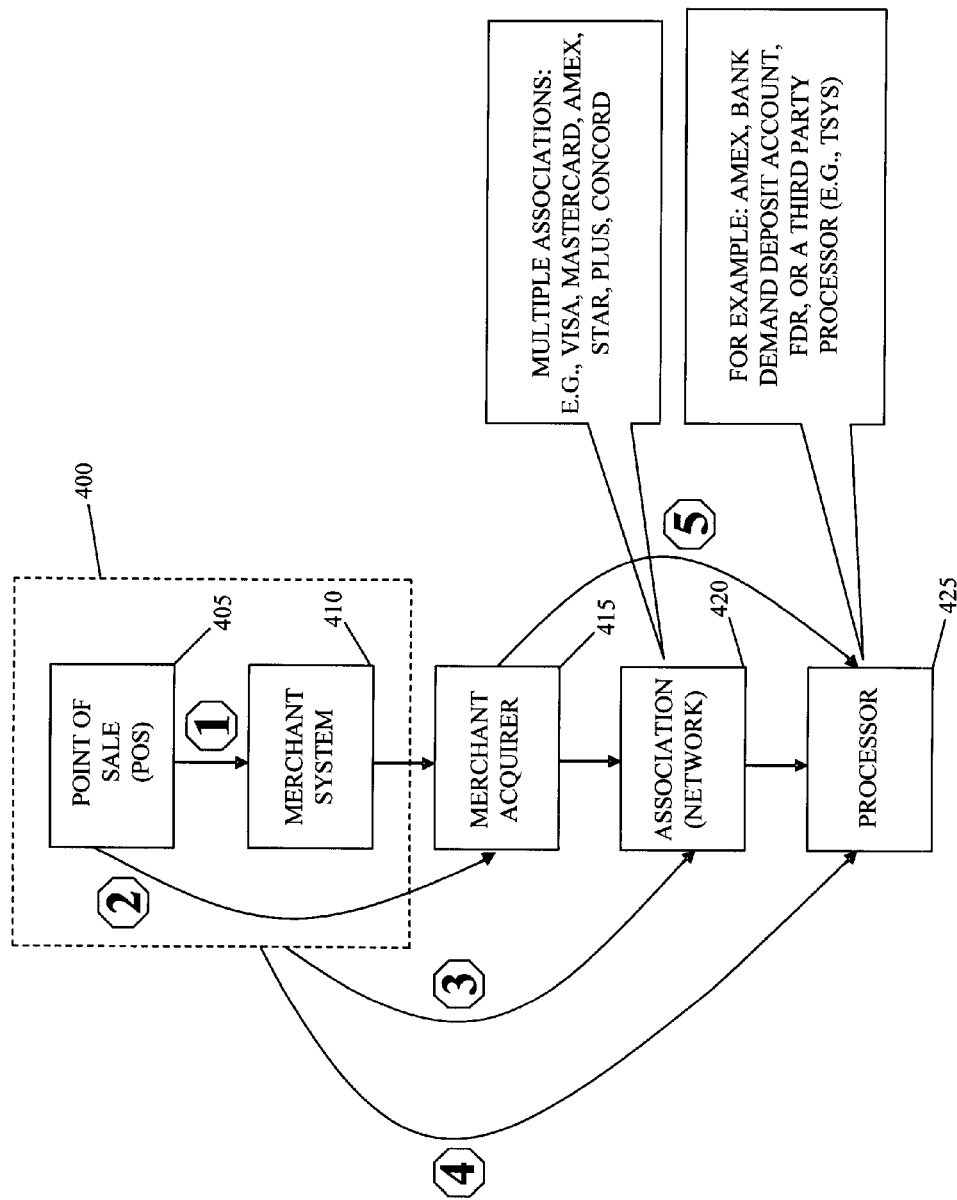
FIG. 4 is a diagram of a processing chain infrastructure that may be used in conjunction with the present invention.

FIG. 4 illustrates the processing chain infrastructure which may be used in conjunction with the present invention. The exemplary processing chain includes the following processors: merchant processor 400, merchant acquirer 415, association/network 420, and processor 425. Merchant processor 400 processes transactions requested at the merchant site, and may include the subsidiary components of point-of-sale (POS) unit 405 and merchant system 410. POS unit 405 comprises one or more point-of-sale devices for allowing cardholders to transfer funds from selected accounts to the merchant. Merchant system 410 coordinates transaction requests from multiple POS units 405 and may submit them for processing. Merchant system 410 may be an on-site server (e.g., a server for an entire store) or may be an off-site server (e.g., a server for multiple stores).

Transaction requests may be transmitted from merchant processor 400 to merchant acquirer 415 directly from POS device 405 (along route (2)) or from merchant system 410 (along route (1)). Generally, merchant acquirer 415 receives transaction requests from merchant processor 400 and routes them to the appropriate association/network 420. Examples of association/network 420 include the VISA interchange, MasterCard interchange, AMEX, STAR, PLUS, and similar organizations created for processing and settling certain types of transactions. Association/network 420 performs this function by routing transaction requests to the appropriate member processor 425. Just by way of example, a transaction request for a VISA charge to an account issued by Bank One will be routed by merchant acquirer 415 to the VISA network association 420, which in turn will route the transaction to a Bank One processor 425 (or third party processor processing such transactions for Bank One).

The multiple purpose card of the present invention may be processed based on the infrastructure of FIG. 4 and certain decisioning logic implemented thereon. At the outset, it is noted that the invention is amenable to processing along one of multiple routes on the processing chain of FIG. 4, including route (1) (conventional processing route through the processing chain), route (2) (conventional processing route bypassing merchant system 410); route (3) (non-conventional route bypassing merchant acquirer 415), route (4) (non-conventional route bypassing by merchant acquirer 415 and association/network 420, and route (5) (non-conventional route where the route runs from the merchant acquirer 414 to processor 425, skipping or bypassing association/network 420).

It should be understood that the decisioning logic discussed below not only performs the function of selecting an appropriate account, but the corollary is that the selection also determines the route for the transaction. For example, if the decisioning logic selects a credit account for a transaction request involving the multiple purpose card, then the routing typically is through one of the credit interchanges (e.g., VISA). On the other hand, if a debit account is selected, the routing is typically through a debit network. Therefore, in one sense the invention is understood to be a technique for not only dynamically selecting accounts from a multiple purpose card on a transaction-by-transaction basis, but also dynamically selecting routing on such a basis.

The decisioning logic for processing transactions initiated via the multipurpose card of the present invention may be implemented according to several embodiments.

Operations at the POS

A first embodiment focuses on decisioning occurring at the POS device based on a multiple purpose card having information corresponding to multiple accounts. For example, the multipurpose card may store information for several different account types, such as a credit account, bank/debit/ATM account, and a stored value account. The account data may be stored on the several tracks of the magnetic stripe.

According to one aspect of the first embodiment, the cardholder initiating a POS transaction selects which transaction type (account) prior to swiping the card. Accordingly, the POS device reads the account information for the selected account based on the user's input. According to this approach, the cardholder's pre-swipe input effectively tells the POS device which account data (e.g., which track) to read.

Because the correct account has been selected, the POS device can then formulate the transaction request in the usual fashion. For example, the transaction request may include account information a bank ID and an account number. The transaction request may also include transaction information such as one or more of a merchant ID, an amount, and a transaction type identifier. This transaction request can then be forwarded from the POS device (i.e., from merchant processor 400 (or from either of its components, POS device 405 or merchant system 410)) down the processing chain for approval processing and ultimately, settlement. For example, the formulated transaction request can be transmitted via route (1), route (2), route (1)/(2) combined with route (5), route (3), or route (4). Some of the aforementioned routes bypassing certain elements (e.g., bypassing association 420) may improve speed, efficiency, and avoid certain interchange processing fees.

According to another aspect of the first embodiment, the cardholder swipes the multipurpose card without first selecting a transaction type. According to this aspect, the POS device reads all of the account information from the multiple purpose card (e.g., the account information for the credit account, bank/debit/ATM account, and a stored value account). The cardholder then, after swiping the card, provides an input selecting the preferred type of account for the transaction. In this approach, the POS device may provide a query to the cardholder after recognizing that the card is a multiple purpose card. According to this aspect of the first embodiment, the POS device preferably reads all tracks from the magnetic stripe. Because the correct account has been selected, the POS device can then formulate the transaction request in the usual fashion.

As with the previous aspect of the first embodiment, because the correct account has been selected the POS device can then formulate the transaction request in the usual fashion. This transaction request can then be forwarded from the POS device down the processing chain for approval processing and ultimately, settlement, such as by using route (1), route (2), route (1)/(2) combined with route (5), route (3), or route (4).

According to a first aspect of a second embodiment focusing on operations as the POS, the multiple purpose card is a card having a single master account (e.g., an alias account) corresponding to the multiple accounts associated therewith. According to this aspect, the cardholder will select an account associated with the card after swiping the card. Alternatively, he cardholder may select an type of account. The cardholder selection comprises additional information that will ultimately be used to retrieve (and perhaps validate) the proper account (e.g., the account corresponding to the user's selection and/or the account that is selected based on certain rules applied by the processor chain to select one of the accounts associated with the master account).

This aspect of the second embodiment entails decision making logic elsewhere in the processing chain so that the proper account (as described in the previous paragraph) is selected and used to formulate the transaction request that is processed to approval and settlement.

Therefore, in this embodiment the POS device/merchant processor will forward a preliminary transaction request comprising the master account information (alias) and additional information comprising the user selection. The user selection expressing an account preference or requirement (or account type) may take various forms, including customer-specific information that selects and validates an account (e.g., a PIN number or similar code associated with the specific account) or other information such as simply selecting the transaction type (e.g., C for credit; D for debit; A for ATM; and S for stored value). In either case, the additional information will be appended with the master account information (or alias) in the preliminary transaction request. The decisioning for the formulation of the actual transaction request (e.g., a request including the selected account) may then take place at one of the "downstream" elements in the processing chain (e.g., at the merchant acquirer, at the association, at the issuer, or at a processor), to be discussed below.

Finally, according to a first aspect of a third embodiment, the multiple purpose card includes the master account and is swiped as previously described, but the cardholder is not required to make a selection. Rather, in this approach, the master account (alias) information will be transmitted in the preliminary transaction request without the so-called additional information. Therefore, the decisioning logic for selecting the appropriate account from the multiple accounts associated with the master account will be based on predefined rules that may be set by various parties to the transaction, including the cardholder, the merchant, the merchant acquirer, the association, and the issuer.

As reflected by the descriptions above, the first embodiment (wherein the card includes the multiple account data and the user makes a selection at the POS to ensure the correct account is used to formulate the transaction request) does not necessarily require decisioning after the POS.

On the other hand, the second and third embodiments (wherein the card includes the master account which will be subsequently used to access one of its associated accounts) entail decisioning after the POS because the "proper" account must be selected/retrieved to formulate the transaction request.

Operations at the Merchant System

In the invention according to the second and third embodiments (where the card includes a master account/alias) discussed above, the decisioning can occur at the merchant system. Thus, the merchant system can receive the preliminary transaction request (PTR) provided by the POS device. This PTR data may include (a) the master account and some additional data reflecting a user selection (second embodiment above), or (b) the master account without user selection data (third embodiment above).

In the first scenario, (a), therefore, the merchant system may use the master account and the additional information to retrieve the corresponding account. For example, if the additional information comprises a user PIN designating one of the user's credit accounts or a "C" for credit (or similar information designating a transaction type where only one account of the type is associated with the card), the merchant system may access a database (local or remote) to retrieve the designated credit account corresponding to the master account. The merchant system can then use that information to formulate the transaction request in the usual way. The merchant system can then forward the transaction request for further processing along one of the various routes from FIG. 4, such as route (1) (continuing all the way through the processing chain) or one of routes (3) or (4) that bypass certain elements. The routing, of course, will be based on the type of transaction (e.g., a credit transaction will be routed appropriate for credit transactions).

In the second scenario, (b), the merchant system accesses rules to decide where to route the PTR request. These rules may be rules set by the cardholder or merchant, for example. These rules may be "hard" rules insofar they must be complied with, or they may be preferences insofar they must be complied with if possible (e.g., they are complied with as long as they do not conflict with others' rules). Exemplary cardholder rules used in the decisioning to access the proper account would be the following: Cardholder A for Master Account X wants his credit account to be used for transactions at WaWa; his stored value account to be used for transactions at Starbucks; otherwise, all transactions less than $5 levied against the stored value account; otherwise, all transitions between $5 and $50 to be levied against his debit account; otherwise, all transactions more than $50 to be levied against his credit account). In another example, the cardholder may designate a personal credit account as a default account, but designate that all airline and hotel transaction be levied against a company credit card account. Exemplary merchant rules used for the decisioning might be such things as: all transactions less than $10 must be either stored value or debit transactions (no credit transactions).

Because the rules considered by the merchant system may conflict, the decisioning logic may include arbitration. This arbitration could seek a solution acceptable to all parties without consulting any party. For example, if the cardholder's rules are identified as preferences, then the outcome (selected account for the transaction) that best satisfies the cardholder's preferences without violating a merchant "rule" (i.e., not a mere preference) may be selected. On the other hand, the arbitration could operate to give either the cardholder or the merchant the option to override a rule if the transaction requires it. For example, take the scenario where the transaction is for $9, the cardholder's rule is all transactions greater than $5 are executed to a particular credit account, and the merchant's rule is that all transactions less than $10 must be non-credit transactions. The decisioning logic may issue a query to allow either the cardholder and/or the merchant to override the party's respective rule for that transaction.

Continuing with the processing flow, after the decisioning logic makes a determination as to the proper nature of the transaction, the proper account corresponding to the master account is accessed, a complete transaction request is formulated, and the request is forwarded as described above for the first scenario.

It should be noted that it is possible that the second and third embodiments could be combined. For example, the PTR received might include the master account and user selection information. That user selection information might be assessed in conjunction with the rules (i.e, both the cardholder rules and the merchant rules or just the merchant rules) to select an account. On the other hand, the decisioning logic could be configured to always make a decision based on user selection information if it is present, and if it is not present the decisioning logic defaults to the rules (i.e., the cardholder rules).

It should also be noted that a further variation exists where the account lookup occurs further down in the chain. In other words, the decisioning regarding which account to access (or which type of transaction is to occur, e.g. stored value or ATM/debit/bank or credit) occurs at the merchant system. Information regarding this decision is appended to the master account, and this amended PTR is forwarded down the chain. The amended PTR (e.g., the master account appended with additional information comprising a designation of the nature of the selected transaction) can then be processed by, for example, the downstream merchant acquirer to look up the proper account. The point is that the decisioning and the account lookup may or may not be carried out at the same points in the processing chain.

Operations at the Merchant Acquirer

The decisioning can be performed at the merchant acquirer, rather than at the merchant system. Therefore, for the first scenario, (a), discussed in the previous section, the merchant acquirer may use the master account and the additional information to retrieve the corresponding account. The transaction request is formulated and transmitted further for approval and settlement in the usual way.

For the second scenario, (b), discussed above, the merchant acquirer may refer to rules or preferences (e.g., cardholder rules, merchant acquirer rules, association rules, processor rules, and/or issuer rules) using decisioning logic that selects the proper type of transaction. Then the merchant acquirer can look up the account for that transaction type based on the master account and formulate the complete transaction request. Or alternatively, the merchant acquirer can simply append the decisioning result (e.g. account selection or transaction type) as additional information that will be used by a downstream element to look up the account.

Operations at the Associations/Networks

Decisioning can be performed at the association level, rather than the merchant system or merchant acquirer. Therefore, for the first scenario (a) discussed in the previous section, the association system may use the master account and the additional information to retrieve the corresponding account. The transaction request is completed and transmitted further for approval and settlement in the usual way.

For the second scenario (b) discussed above, the association system may refer to rules or preferences (e.g., cardholder rules, association rules, processor rules, and/or issuer rules) using decisioning logic that selects the proper type of transaction. Then the association system can look up the account for that transaction type based on the master account and complete the complete transaction request. Or alternatively, the association system can simply append the decisioning result (e.g. account selection or transaction type) as additional information that will be used by a downstream element (e.g., a processor for that transaction type for that issuer) to look up the account.

Examples of rules that might be imposed by associations would be a rule that forces credit transactions or a rule for/against online (need a PIN) debit transactions or offline (do not need a PIN) debit transactions.

At this juncture, it should also be noted that any arbitration logic for the sets of rules may operate according to a hierarchy, such as the following in order of dominant to least dominant rules: cardholder, merchant, merchant acquirer, and association. The priority of the rule sets can be varied from this example without departing from the spirit and scope of the invention.

Operations at the Processor

As discussed above for FIG. 4, the processor is the system element that actually processes transactions to approval for the selected transaction type for a given issuer.

According to the invention, the decisioning can be performed at the processor level. Therefore, for the first scenario, (a), discussed in the previous section, the processor may use the master account and the additional information to retrieve the corresponding account. The complete transaction is then processed for approval and settlement in the usual way.

For the second scenario, (b), discussed above, the processor may refer to rules or preferences (e.g., cardholder rules, processor rules, and/or issuer rules) using decisioning logic that selects the proper type of transaction. Then the processor can look up the account for that transaction type based on the master account and complete the complete transaction processing.

Post-Transaction Decisioning

A further variation to the invention provides for post-transaction decisioning. In this approach, a transaction is processed to approval and actually settled vis-à-vis the merchant through a generic pool account for the cardholder. However, the settlement vis-à-vis the cardholder can be deferred pending a selection by the cardholder (or other entity) based on a set of rules or based on a cardholder selection.

This variation would permit, for example, a cardholder to use the multiple purpose card with a master account to fully process the transaction with respect to the merchant. However, the cardholder could decide in time-late fashion which specific account the transaction would be applied to. Thus at a time convenient to the cardholder, the cardholder is able to review the transactions settled in the generic pool. During this review the cardholder associates each transaction with an account for final posting. For example, the cardholder may designate a specific account (e.g. a credit card account, debit/bank/ATM account, or stored value account) for each individual transaction in the generic pool. Alternatively, the cardholder may provide rules to address multiple transactions (e.g. designating a business credit card for all travel charges for a certain time period, or a designating an account linked to a brokerage account for all transactions exceeding a given amount). The cardholder may use various interfaces to the issuer to select an account, such as an interactive voice response unit (dial-up and touchtone selection), a phone call (interface with a human being), Internet access, and the like.

Other embodiments, uses and advantages of the present invention will be apparent to those skilled in the art from consideration of the specification and practice of the disclosed invention. The specification and disclosed embodiments are exemplary.

What is claimed is:

1. A computer-implemented method for using a financial transaction device to access multiple accounts, comprising:
issuing a financial transaction device to a cardholder wherein the financial transaction device stores machine readable data corresponding to a first account;
processing, by a computer processor, a transaction initiated by the financial transaction device by reading the machine readable data;
receiving a selection of a second account against which the transaction is to be processed, following the initiation of the transaction, wherein the second account is selected from at least one additional account associated with the cardholder and the at least one additional account differs from the first account;
receiving a transaction request, based upon the transaction initiated by the financial transaction device, from a point of sale or merchant processor, wherein the transaction request comprises the machine readable data corresponding to the first account appended with the selection of the second account; and
routing, by the computer processor, the transaction through a financial processing chain based on the selection of the second account appended in the transaction request wherein decision-making logic is applied in the processing chain to process the transaction request against the second account.

2. The method of claim 1, wherein the first account comprises a master account.

3. The method of claim 1, wherein the at least one additional account comprises:
a credit account;
a debit account;
an ATM account; or
a stored value account.

4. The method of claim 1, wherein a personal identification number is required to complete the transaction.

5. The method of claim 1, wherein the financial processing chain includes one or more of a merchant system, a third party pre-router system, a merchant acquirer system, a card network, and a processor system.

6. The method of claim 1, further comprising: applying at least one arbitration rule to resolve a conflict between the selected second account and a rule applied to the transaction by a merchant associated with the point of sale or merchant processor, wherein the at least one arbitration rule presents an option for override.

* * * * *